Figure 1:
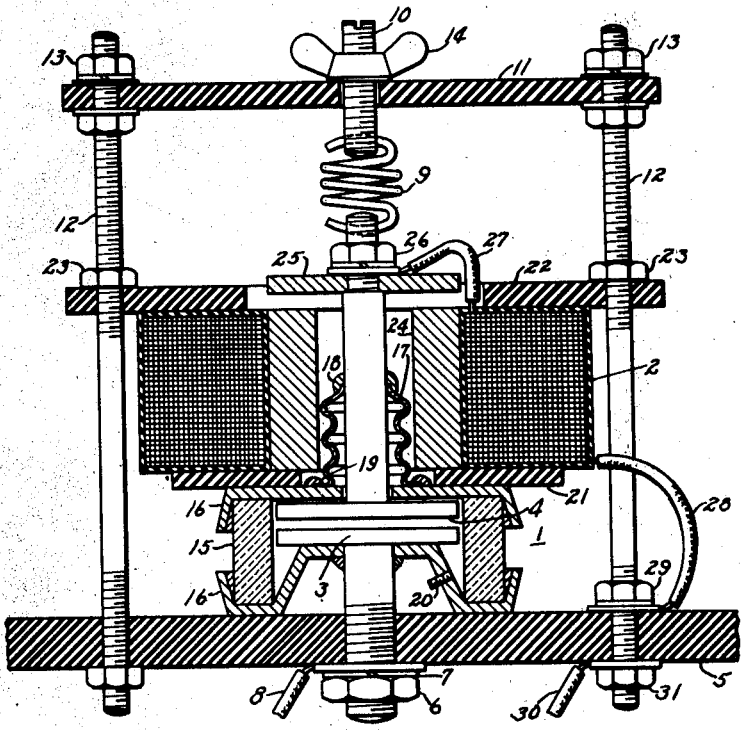

July 6, 1943.  W. E. BERKEY  2,323,702

VOLTAGE RESPONSIVE SWITCH

Filed Aug. 2, 1940

WITNESSES:
Leon M. Garman
F. P. Lyle

INVENTOR
William E. Berkey.
BY O.D. Buchanan
ATTORNEY

Patented July 6, 1943

2,323,702

UNITED STATES PATENT OFFICE 2,323,702

VOLTAGE RESPONSIVE SWITCH

William E. Berkey, Forest Hills, Pa., assignor to Westinghouse Electric & Manufacturing Company, East Pittsburgh, Pa., a corporation of Pennsylvania Application August 2, 1940, Serial No. 349,390

4 Claims. (Cl. 200—87)

The present invention relates to protective devices for series capacitors or similar circuit elements, and, more particularly, to a simple and inexpensive device for protecting them against overvoltages caused by abnormal line currents.

Series capacitors are connected in series with alternating current transmission or distribution lines in order to neutralize part or all of the inductive reactance of the line, and thus to improve the voltage regulation and increase the stability limits. Capacitors are also sometimes connected in series with certain types of industrial apparatus which have a fluctuating power demand, such as welders and electric furnaces, in order to neutralize the inductive reactance of the apparatus, and thus decrease the severity of the voltage changes on the system to which it is connected. Since such capacitors are connected in series with the line, they carry the line current, and the voltage across the capacitor is proportional to the current. For this reason, the capacitor may be subjected to very high voltages in case of a short-circuit on the line or a heavy overload. Capacitors cannot be economically used in this way if their voltage rating is selected on the basis of the maximum voltage to which they may be subjected, and it is customary therefore to use capacitors having a voltage rating corresponding to the voltage across the capacitor under normal conditions together with some type of protective equipment to protect the capacitor against the high voltages that may appear across it under abnormal conditions.

Capacitors of the type used for series capacitor installations are designed to withstand an overvoltage of 150% of the rated voltage for very short periods and 200% of the rated voltage momentarily, and it is necessary to by-pass the capacitor if the voltage across it exceeds this value even for an instant. No mechanically operating switch can operate fast enough to give the necessary protection, and for this reason, it is customary to use a spark gap in parallel with the capacitor which breaks down substantially simultaneously with the occurrence of the overvoltage. The normal voltage across a series capacitor is usually of the order of a few hundred volts, and it is extremely difficult to calibrate spark gaps of the usual type for such a low voltage and to maintain their calibration unchanged after repeated operations because of the burning of the electrodes by the arc between them. For this reason, it has not been satisfactory to connect the spark gap directly across the terminals of the capacitor, and auxiliary gaps and transformers have been used to initiate breakdown of a main gap which is set for a considerably higher voltage than can be permitted to appear across the capacitor. With this type of protective equipment, it is necessary to by-pass the gap immediately after it has broken down in order to prevent damage to the gap and to surrounding structures by the arc, since the current traversing the gap may be very heavy, and for this purpose, a contactor is usually provided to complete a shunt circuit around both the gap and the capacitor immediately after the gap has broken down.

Thus, the protective equipment which has been used with series capacitors has involved the use of transformers, auxiliary gaps, and contactors, and has been relatively complicated and expensive. The cost of the protective equipment has seriously restricted the use of series capacitors, since in many cases in which a relatively small capacitor would be desirable, the cost of the necessary protective equipment has made it economically unjustifiable, since in small installations, the cost of the protective equipment may even be greater than that of the capacitor units themselves.

The principal object of the present invention is to provide a protective device for series capacitors which is of very simple and inexpensive construction.

A further object of the invention is to provide a protective device for series capacitors using a new type of spark gap which can be accurately calibrated for low breakdown voltage, and which will retain its calibration unchanged after repeated operation.

A still further object of the invention is to provide a protective device for series capacitors having a spark gap which is connected directly across the capacitor terminals and means for moving the electrodes of the gap into contact to by-pass the capacitor immediately after breakdown of the gap has occurred.

The new protective device consists essentially of a combined spark gap and contactor having relatively movable electrodes which form a spark gap between them, and means for moving the electrodes together as soon as current flows across the gap, thus extinguishing the arc and by-passing the capacitor. The spark gap formed between the two electrodes is enclosed in an airtight chamber and operates at a low pressure, which is preferably less than 10 centimeters of mercury. Spark gaps of this type are disclosed and claimed in a copending application of J. Slepian and W. E. Berkey, Serial No. 358,634, filed September 27, 1940, and assigned to the Westinghouse Electric & Manufacturing Company. As more fully set forth in that application, a spark gap operating at low pressure within a critical range between 10 centimeters and 0.1 centimeter of mercury shows substantially no burning or erosion of the electrodes, because of the low current density at the arc terminals, and thus the electrodes can be closely spaced and the gap accurately calibrated for a low breakdown voltage, since there is no change in the effective spacing of the electrodes after repeated operation, such as is caused by burning of the electrodes in conventional spark gaps operating at atmospheric pressure. The low pressure spark gap also has the desirable characteristic that the breakdown voltage is greatly reduced from its value at atmospheric pressure but the reignition or arc extinction voltage is not substantially changed, so that a very low ratio of breakdown voltage to extinction voltage is obtained. This makes such a gap a self-extinguishing device in that the arc will not restrike after passing through a current zero if the voltage across the gap has fallen to a value only slightly less than the breakdown voltage.

Thus, a spark gap operating at low pressure can be used very effectively for the protection of a series capacitor since it can be accurately adjusted to the necessary low breakdown voltage and connected directly across the capacitor terminals, thus avoiding the necessity for the complicated auxiliary equipment which has heretofore been necessary. Since very heavy currents may be discharged by the gap in case of a short-circuit on the line, it is not desirable to permit the arc to exist for more than a few half cycles, and for this reason, the protective device of the present invention is constructed to function as a combined spark gap and contactor, and means are provided for moving the electrodes into contact immediately after the gap has broken down so as to extinguish the arc and provide a shunt around the capacitor to protect it from the overvoltage.

Figure 2:
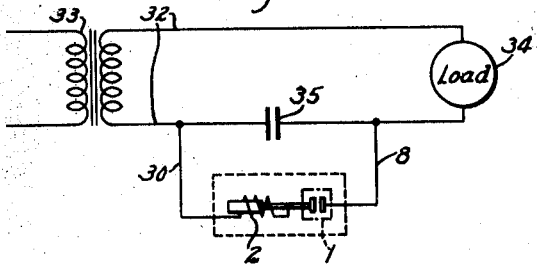

The invention will be more fully understood from the following detailed description, taken in connection with the accompanying drawing, in which:

Figure 1 is a vertical sectional view of a preferred embodiment of the invention; and Fig. 2 is a wiring diagram showing the connection of the new protective device to a series capacitor.

The protective device of the present invention consists essentially of a spark gap device 1 connected in series with a solenoid 2 across the terminals of the capacitor or other device to be protected. The spark gap 1 has a pair of electrodes 3 and 4 of copper or brass, which are normally spaced apart a short distance which is preferably of the order of one or two millimeters to provide the desired low breakdown voltage. The lower electrode 3 is stationary and is secured in position on an insulating base 5 of any suitable construction by means of a nut 6 and lock washer 7 threaded on the end of the electrode. A lead 8 may be clamped under the washer 7 for connection to the protected device. The upper electrode 4 is movable and is held in the normal separated position of the electrodes by means of a helical spring 9 secured to its upper end and also secured to a threaded stud 10. The stud 10 passes through an upper insulating plate 11 which is mounted on the base 5 by threaded rods 12 to which it is secured by nuts and lock washers 13. The stud 10 is adjustable in position by means of a wing nut 14 to adjust the tension of the spring 9.

The spark gap formed between the electrodes 3 and 4 in their normal separated position is enclosed in an air-tight chamber in which the pressure is less than 10 centimeters of mercury. This chamber is preferably formed by a cylindrical wall 15 of porcelain or other suitable insulating material, and has top and bottom members 16, which may be of brass or other suitable material sealed to the porcelain cylinder 15 by soldering to platinized surfaces of the porcelain, or in any other suitable manner, to form an airtight seal. A bellows 17 is brazed to the upper electrode 4 as indicated at 18, and to the upper member 16 as indicated at 19, in order to permit movement of the electrode 4 without breaking the seal. A pumping connection 20 is provided in the lower member 16 by means of which the closed chamber may be partially evacuated to the desired pressure, after which the pump connection is sealed off.

A solenoid 2 is provided to move the electrode 4 after the gap has broken down. The solenoid 2 may conveniently be positioned immediately above the gap device 1, and is preferably supported on an insulating plate 21 which rests on top of the gap device 1. The solenoid may be clamped in position by means of another insulating plate 22 which rests on top of it and is held in position by means of nuts 23 on the threaded rods 12. The solenoid 2 has a cylindrical iron core 24 through which the electrode 4 passes, and an armature 25 in the form of an iron disc is clamped to the electrode 4 by means of a nut 26. The solenoid 2 is connected in series with the gap device 1 by means of a conductor 27 which may conveniently be clamped under the nut 26 to make connection with the electrode 4, and the opposite end of the solenoid 2 is connected by means of a conductor 28 to one of the threaded rods 12, the conductor being clamped under a nut 29. A suitable lead 30 may be clamped under a nut 31 to provide for connection of the device to the external circuit.

The new protective device is adapted to be connected directly across the terminals of a series capacitor to be protected, as shown in Fig. 2. This figure shows a single phase alternating current line 32 which is supplied from a transformer 33 and connected to a load indicated diagrammatically at 34. A capacitor 35 is connected in series with the line to neutralize part or all of the inductive reactance of the circuit, and a protective device consisting of the spark gap 1 and solenoid 2 as described above is connected directly across the terminals of the capacitor 35, as indicated in the drawing.

The operation of the protective device should now be apparent. The enclosed spark gap device 1 operating at low pressure in the critical range between 10 centimeters and 0.1 centimeter of mercury has the spacing between the electrodes in their normal separated position and the pressure in the enclosed chamber adjusted to give the desired breakdown voltage, which should correspond to approximately 200% of the normal voltage rating of the capacitor 35. When a voltage in excess of this value appears across the capacitor 35 as a result of short-circuit current or a heavy overload current flowing through the capacitor, the gap 1 will immediately break down, thus by-passing the capacitor to protect it from the overvoltage. The gap current flows through the solenoid 2 which is in series with the gap, and if the excess current is maintained for more than a few half cycles, the movable electrode 4 will be drawn downward against the tension of the spring 9, bringing the electrodes 3 and 4 into contact, and thus extiguishing the arc and forming a shunt circuit around the capacitor to protect it from the overvoltage. As soon as the line current, which now flows through the solenoid 2, has decreased to a predetermined value, the magnetic force of the solenoid 2 will be overcome by the spring 9 which will draw the electrode 4 upward to its normal position against the top member 16, thus interrupting the shunt circuit and restoring the capacitor to service. The exact value of current at which the electrodes will be separated can be determined by adjusting the tension of the spring 9 by means of the wing nut 14.

It should now be apparent that a protective device has been provided for series capacitors which is of simple and inexpensive construction, but which is very effective and reliable in its operation. Because of the characteristics of the low pressure spark gap, as described above, and as more fully set forth in the above mentioned copending application, the gap may be accurately calibrated for a relatively low breakdown voltage and it will maintain its calibration unchanged after repeated operation because of the absence of substantial burning of the electrodes by the arc. If the overvoltage lasts for only a few half cycles so that it has passed before the solenoid 2 can operate to close the electrodes together, the arc will be extinguished because of the high extinction voltage of the low pressure gap as compared to its breakdown voltage, which will prevent the arc from restriking after a current zero, if the voltage has fallen to a value a little below the breakdown voltage. If the overvoltage is maintained for more than a few half cycles, the upper electrode 4 is moved into contact with the lower electrode, thus extinguishing the arc and preventing any possibility of damage to the gap or the enclosing structure by the high current discharge. When the overvoltage has passed, the spring opens the electrodes and restores them to their normal separated position, thus restoring the capacitor to service and leaving the protective device ready to operate again. The tension of the spring 9 can be adjusted to determine the value of current at which the electrodes will open, and this value is preferably made equal to the normal full load current. As a switch, the electrodes are only required, therefore, to open the normal full load current, and this is a relatively light duty, especially with the capacitor in shunt with the gap.

It is to be understood that the invention is capable of various modifications and embodiments. Thus, instead of a solenoid for closing the electrodes together, any other suitable current responsive device may be used for effecting this operation in response to the flow of current across the gap, and any means may be used for restoring the movable electrode to its initial position after the excess current has passed. The low pressure gap device 1 is preferably filled with air at a pressure in the range less than 10 centimeters of mercury, but other inert gases, such as nitrogen, might also be used. Thus, it will be obvious that although a preferred embodiment has been illustrated and described, the invention is not limited to the exact features of construction shown, but in its broadest aspects, it includes all equivalent modifications and embodiments which come within the scope of the appended claims.

I claim as my invention:

1. An overvoltage protective device for electrical apparatus comprising an enclosed chamber, a pair of plane electrodes within the chamber forming a spark gap between them, one of said electrodes being fixed in position within the chamber and the other electrode being movable, the movable electrode having a portion extending outside the chamber, biasing means external to the chamber attached to said extending portion and normally holding the movable electrode so as to accurately space it a predetermined distance from the fixed electrode, and current-responsive means external to said chamber for moving the movable electrode into contact with the fixed electrode in response to current-flow through the electrodes.

2. An overvoltage protective device for electrical apparatus comprising an enclosed chamber, a pair of plane electrodes within the chamber forming a spark gap between them, one of said electrodes being fixed in position within the chamber and the other electrode being movable, the movable electrode having a portion extending outside the chamber, biasing means external to the chamber attached to said extending portion and normally holding the movable electrode so as to accurately space it a predetermined distance from the fixed electrode, and a solenoid mounted externally of said chamber and connected in series with the electrodes, said solenoid being adapted to move the movable electrode into contact with the fixed electrode in response to current-flow through the electrodes.

3. An overvoltage protective device for electrical apparatus comprising an enclosed, gas-tight chamber, a pair of plane electrodes within the chamber forming a spark gap between them, said chamber being partially evacuated to subatmospheric pressure, one of said electrodes being fixed in position within the chamber and the other electrode being movable, the movable electrode having a portion extending outside the chamber, gas-tight sealing means for preventing the entrance of air into the chamber around said extending portion, biasing means external to the chamber attached to said extending portion and normally holding the movable electrode so as to accurately space it a predetermined distance from the fixed electrode, and current-responsive means external to said chamber for moving the movable electrode into contact with the fixed electrode in response to current flow through the electrodes.

4. An overvoltage protective device for electrical apparatus comprising an enclosed, gas-tight chamber, a pair of plane electrodes within the chamber forming a spark gap between them, said chamber being partially evacuated to subatmospheric pressure, one of said electrodes being fixed in position within the chamber and the other electrode being movable, the movable electrode having a portion extending outside the chamber, gas-tight sealing means for preventing the entrance of air into the chamber around said extending portion, biasing means external to the chamber attached to said extending portion and normally holding the movable electrode so as to accurately space it a predetermined distance from the fixed electrode, and a solenoid mounted externally of said chamber and connected in series with the electrodes, said solenoid being adapted to move the movable electrode into contact with the fixed electrode in response to current flow through the electrodes.

WILLIAM E. BERKEY.